United States Patent [19]
Tabuchi et al.

[11] Patent Number: 5,791,039
[45] Date of Patent: Aug. 11, 1998

[54] METHOD FOR MANUFACTURING A ROTOR OF A MAGNETIC CLUTCH

[75] Inventors: Yasuo Tabuchi, Anjo; Junichi Ohguchi, Toyoake; Akira Kishibuchi, Nagoya; Masashi Tobayama, Oobu; Yasuhiro Suzuki, Nagoya; Hiroaki Ito, Nishio, all of Japan

[73] Assignee: Nippondenso Co., Ltd., Kariya, Japan

[21] Appl. No.: 694,804

[22] Filed: Aug. 9, 1996

Related U.S. Application Data

[63] Continuation of Ser. No. 213,793, Mar. 17, 1994, abandoned.

[30] Foreign Application Priority Data

| May 18, 1993 | [JP] | Japan | 5-058734 |
| Nov. 22, 1993 | [JP] | Japan | 5-291992 |
| Feb. 16, 1994 | [JP] | Japan | 6-019180 |

[51] Int. Cl.$^6$ ........................................ H01F 41/00
[52] U.S. Cl. .................. 29/602.1; 29/418; 29/527.6; 192/84.31
[58] Field of Search ................. 29/602.1, 607, 29/418, 527.3, 527.4, 527.6; 192/84.3, 84.31, 84.9, 84.5

[56] References Cited

U.S. PATENT DOCUMENTS

| 2,860,403 | 11/1958 | Meyer | 192/84.9 X |
| 3,712,439 | 1/1973 | Schacher et al. | |
| 4,669,295 | 6/1987 | Koitabashi | 192/84 C X |
| 4,951,797 | 8/1990 | Booth et al. | 192/84 C X |
| 5,096,036 | 3/1992 | Booth et al. | 192/107 R |
| 5,123,157 | 6/1992 | Cerny | 29/607 |

FOREIGN PATENT DOCUMENTS

| 56-55721 | 5/1981 | Japan. |
| 3290911 | 12/1991 | Japan. |

*Primary Examiner*—S. Thomas Hughes
*Attorney, Agent, or Firm*—Cushman Darby & Cushman IP Group of Madison & Sutro LLP

[57] ABSTRACT

A magnetic clutch includes a rotor and an armature facing to each other for establishing a coupling connection. A serpentine magnetic circuit is formed in the rotor and the armature. A method for manufacturing a rotor of a magnetic clutch of the invention comprises the step of deforming a single ring-shaped plate of a magnetic material, by a plastic deformation process such as cold forging, into a ring-shaped element comprising generally concentric inner and outer cylindrical walls, and a ring-shaped bottom wall. Prior to or after or simultaneously with this step, ring grooves are formed on the bottom wall. A nonmagnetic material is then filled in the ring grooves, and the bottom surface of the bottom wall is cut to form a friction surface. By this cutting, the nonmagnetic material is exposed at the friction surface.

10 Claims, 18 Drawing Sheets

METHOD FOR MANUFACTURING A ROTOR OF A MAGNETIC CLUTCH

This is a continuation of application Ser. No. 08/213,793, filed on Mar. 17, 1994, now abandoned.

BACKGROUND OF THE INVENTION

1. Field of the Invention

The present invention relates to a method of manufacturing a magnetic clutch rotor.

2. Description of the Related Art

A conventional magnetic clutch is shown in FIG. 19 of the attached drawings. The magnetic clutch 100 comprises a ring-shaped solenoid coil 101, a bridge type rotor 102 having a U-shaped cross-section and containing the solenoid coil 101 therein, and an armature 103 attracted to the rotor 102 by a magnetic force of the solenoid coil 101.

The attraction force between the rotor 102 and the armature 103 is improved by blocking a magnetic flux through a friction wall 105. Specifically, the armature 103 has a ring slit 104 at a radially intermediate position. Similarly, the rotor 102 has a pair of ring slits 106 in the friction wall 105. The ring slits 106 are positioned laterally on radially inner and outer sides of the ring slit 104 of the armature. Therefore, a serpentine magnetic circuit is formed through the rotor 102 and the armature 103, as shown by α1.

The bridge type rotor 102 of FIG. 19 is manufactured in such a manner that a ring-shaped plate of a magnetic material is deformed, by cold forging or a like process, into a ring-shaped element having a U-shaped cross-section. The rotor 102 includes a friction wall 105 at the bottom of the U-shaped cross-section ring slits 106 are formed on the friction wall 105 by a press.

Alternatively, a non-bridge type rotor is disclosed, for example, in U.S. Pat. No. 3,712,439. Such a rotor is also shown in FIG. 20 of the attached drawings. The non-bridge rotor 116 is formed from a ring-shaped plate of a magnetic material. The ring-shaped plate is bent, by cold forging or a like process, so as to form an outer cylindrical wall 108 and a bottom wall 109 of the rotor. The bottom wall 109 is further processed to form a circumferentially continuously ring-shaped projection 110 at a radially intermediate portion of the bottom wall 109, the projection 110 defines ring grooves 113 on either side of the projection 110. The grooves 113 receive a nonmagnetic material 111 on either side of the projection 110. An inner cylindrical wall 107 of a magnetic material, separately formed from the walls 108 and 109, is then attached to the inner periphery of the bottom wall 109 by welding or screws. The nonmagnetic material 111, while in a molten state, is then deposited into the ring grooves 113 and joins with the grooves 13 upon solidification. A low portion of the bottom wall 109 is then removed so as to form a friction surface 112 and expose the nonmagnetic material 111 at the friction surface 112. The exposed nonmagnetic material 111 blocks the magnetic flux through the rotor 116, as to the ring slits 106 in FIG. 19.

In the bridge type rotor 102, however, the ring slits 106 are not circumferentially continuous. These are portion connecting the radially inner portion 105a, the radially intermediate portion 105b, and the radially outer portion 105c of the friction wall 105. There is a problem that the magnetic flux leaks through these connecting portions. Also in the bridge type rotor 102, it is difficult to obtain a small rotor 102 and to manufacture a small magnetic clutch since it is difficult to form the ring slits 106 at a small distance therebetween by punching in a press.

In the non-bridge rotor 116, it is necessary to precisely attach the inner cylindrical wall 107 to the L-shaped outer cylindrical and bottom walls 108 and 109 in the assembly step. The assembly work, however, is time consuming and a number of parts are necessary. Consequently, the manufacturing cost is increased. Also, a gap may form between the inner cylindrical wall 107 and the bottom walls 109 during assembly. In such a case, the molten nonmagnetic material 111 may spill out of the bottom wall 109, resulting in a low quality product.

Moreover, in the non-bridge rotor 116, the ring-shaped projection 110 and the ring grooves 113 are not suitably formed by coining using a stationary lower die and a movable upper die, i.e., the upper punch 114, as shown in FIG. 21. When the punch 114 is driven into the bottom wall 109, the punch 114 receives reaction forces $F_1$ to $F_4$ such that the wall of the ring grooves 113 constrain the punch 114. The forces $F_2$ and $F_3$ are balanced and do not greatly affect the punch 114. However, the constraining force $F_4$ is higher than the force $F_1$ since the inner cylindrical wall 107 is not connected to the bottom wall 109 during the punch operation and an inner portion of the bottom wall 109 to be connected to the inner cylindrical wall 107 has a lower rigidity than the remaining portion of the bottom wall 109. Therefore, a restraining force acting on the punch 114 concentrates at a portion of the punch corresponding to the position of the inner ring groove when the punch 114 is retracted, and the life of the punch will be shortened by the repeated use of the punch 114.

SUMMARY OF THE INVENTION

The object of the present invention is to solve the above described problems and to provide a method for manufacturing a rotor of a magnetic clutch by which it is possible to easily obtain a rotor having a small size and fewer parts.

Another object of the present invention is to provide a method for manufacturing a rotor of a magnetic clutch by which the rotor can be reliably manufactured without a precise positioning of parts.

Further object of the present invention is to provide a method for manufacturing a rotor of a magnetic clutch by which the life of tool, such as punch, used for processing the rotor can be extended.

According to the present invention, there is provided a method for manufacturing a rotor of a magnetic clutch, the method comprising the steps of: forming a ring-shaped plate of a magnetic material, the ring-shaped plate having a central hole and an outer periphery; deforming the ring-shaped plate, by a plastic deformation process, into a ring-shaped element comprising generally concentric inner and outer cylindrical walls, and a ring-shaped bottom wall interconnecting the inner and outer cylindrical walls, the bottom wall having a top surface on the side of the inner and outer cylindrical walls and a bottom surface on the opposite side of the top surface, a portion of the bottom wall being caused to circumferentially continuously project toward the bottom surface to form a plurality of ring grooves on the top surface; joining a nonmagnetic material to the bottom wall in the ring grooves thereof; and cutting the bottom surface of the bottom wall to form a friction surface and to allow the nonmagnetic material to be exposed at the friction surface.

In this method, the rotor is manufactured from a single ring-shaped plate which is deformed into a ring-shaped element comprising generally concentric inner and outer cylindrical walls, and a ring-shaped bottom wall interconnecting the inner and outer cylindrical walls. The bottom wall is further deformed so as to have a plurality of ring grooves, and a nonmagnetic material is inserted in the ring grooves. The obtained ring-shaped element has a circular trough-like cross-section, and the nonmagnetic material is molten in the ring grooves of the bottom wall between the inner and outer cylindrical walls, without a possibility of the molten nonmagnetic material spilling out from the trough. The nonmagnetic material is strongly joined to the bottom wall. The bottom surface of the bottom wall is then finished by machining or cutting to form a friction surface and the nonmagnetic material is exposed at the friction surface.

In this manner, the obtained rotor has a one piece structure, so there are no parts to be precisely attached to each other. Accordingly, it is possible to easily and reliably manufacture the rotor, and to reduce the manufacturing cost of the magnetic clutch.

Since the ring grooves can be formed by a plastic deformation process, which is different from punching slits, it is possible to realize the rotor having a small size, compared with a conventional rotor having ring slits obtained by punching. The nonmagnetic material blocks the magnetic flux to form an effective serpentine magnetic circuit through the rotor and the cotacting armature, and the rotor and the armature can operate with an effective magnetic action.

In the above described method, it is possible to form the ring grooves prior to or after or simultaneously with the formation of the ring-shaped element.

In this aspect, the method comprises the steps of forming a ring-shaped plate of a magnetic material, the ring-shaped plate having a central hole and an outer periphery; deforming the ring-shaped plate, by a plastic deformation process, into a ring-shaped element comprising generally concentric inner and outer cylindrical walls, and a ring-shaped bottom wall interconnecting the inner and outer cylindrical walls, the bottom wall having a top surface on the side of the inner and outer cylindrical walls and a bottom surface on the opposite side of the top surface; then forming a plurality of circumferentially continuous ring grooves on the top surface of the bottom wall; joining a nonmagnetic material to the bottom wall in the ring grooves thereof; and cutting the bottom surface of the bottom wall to form a friction surface and to allow the nonmagnetic material to be exposed at the friction surface.

Alternatively, the method comprises the steps of forming a ring-shaped plate of a magnetic material, the ring-shaped plate having a top surface, a bottom surface, a central hole, an outer periphery, and radially inner, intermediate, and outer portions between the central hole and the outer periphery; causing the radially intermediate portion, by a plastic deformation process, to circumferentially continuously sink toward the bottom surface, then causing a portion of the projecting portion to circumferentially continuously project toward the bottom surface to form a plurality of ring grooves on the top surface; then bending the radially inner and outer portions of ring-shaped plate relative to the radially intermediate portion, by a plastic deformation process, into a ring-shaped element comprising generally concentric inner and outer cylindrical walls, and a ring-shaped bottom wall interconnecting the inner and outer cylindrical walls; and cutting the bottom surface of the bottom wall to form a friction surface and to allow the nonmagnetic material to be exposed at the friction surface.

In addition, after joining a nonmagnetic material to the bottom wall in the ring grooves thereof, the step of exposing the nonmagnetic material from the friction surface can be modified in the following manner.

In one modification, the method comprises the steps of, after the step of joining a nonmagnetic material, cutting the bottom surface of the bottom wall to form a friction surface by such an amount that the nonmagnetic material is not exposed at the friction surface; and forming a ring groove on a portion of the friction surface corresponding to the location of the ring grooves where the nonmagnetic material is joined so that the nonmagnetic material is exposed at the friction surface.

In another modification, the method comprises the steps of, after the step of joining a nonmagnetic material, cutting the bottom surface of the bottom wall to form a friction surface by such an amount that the nonmagnetic material is exposed at the friction surface; and forming a ring groove on the friction surface so that the nonmagnetic material is exposed at the friction surface by removing the nonmagnetic material at a radial width corresponding to a radial width of the nonmagnetic material at the friction surface.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

The method for manufacturing the rotor of the magnetic clutch according to the present invention will now be described with reference to the preferred embodiments in connection with the attached drawings.

Figure 1A:
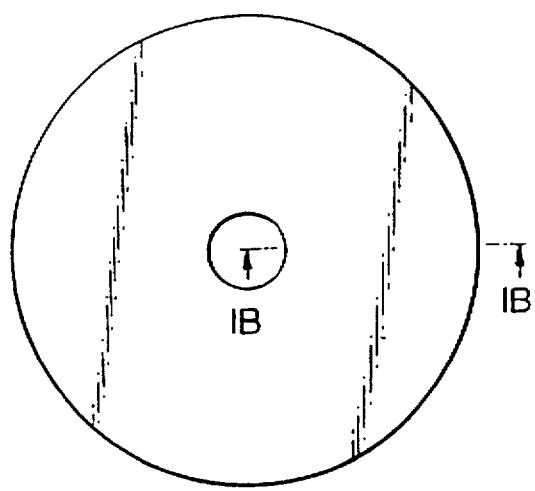
FIGS. 1A to 1G are views illustrating the steps of a method for manufacturing a rotor of a magnetic clutch according to the first embodiment of the present invention.
Figure 1B:
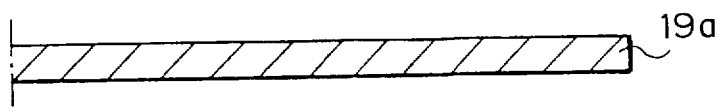
Figure 1C:
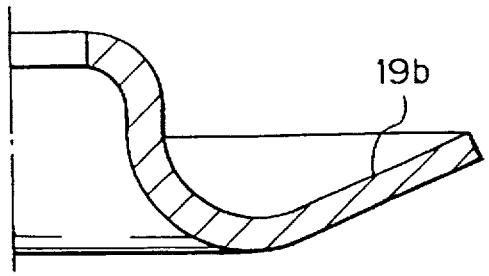
Figure 1D:
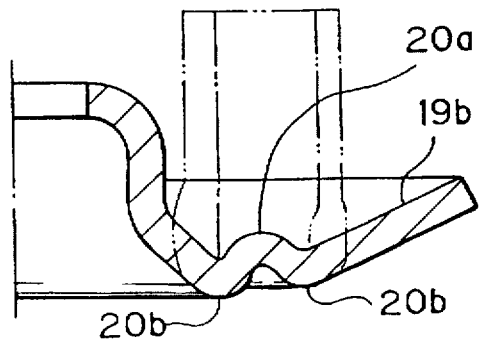
Figure 1E:
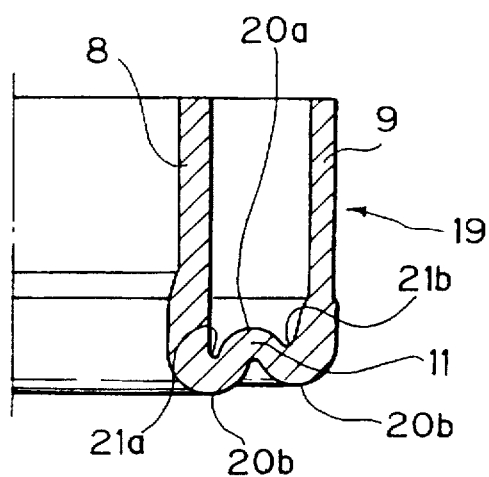
Figure 1F:
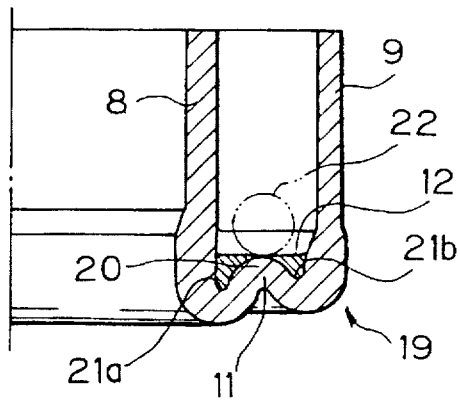
Figure 1G:
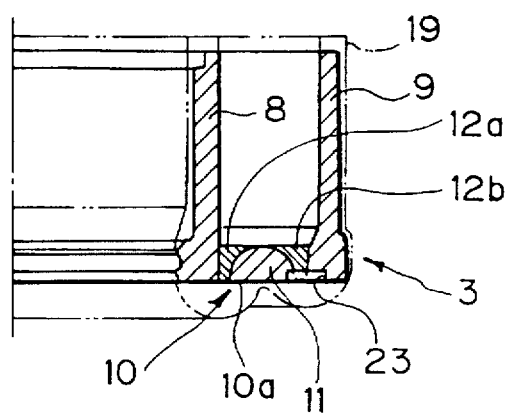
Figure 2:
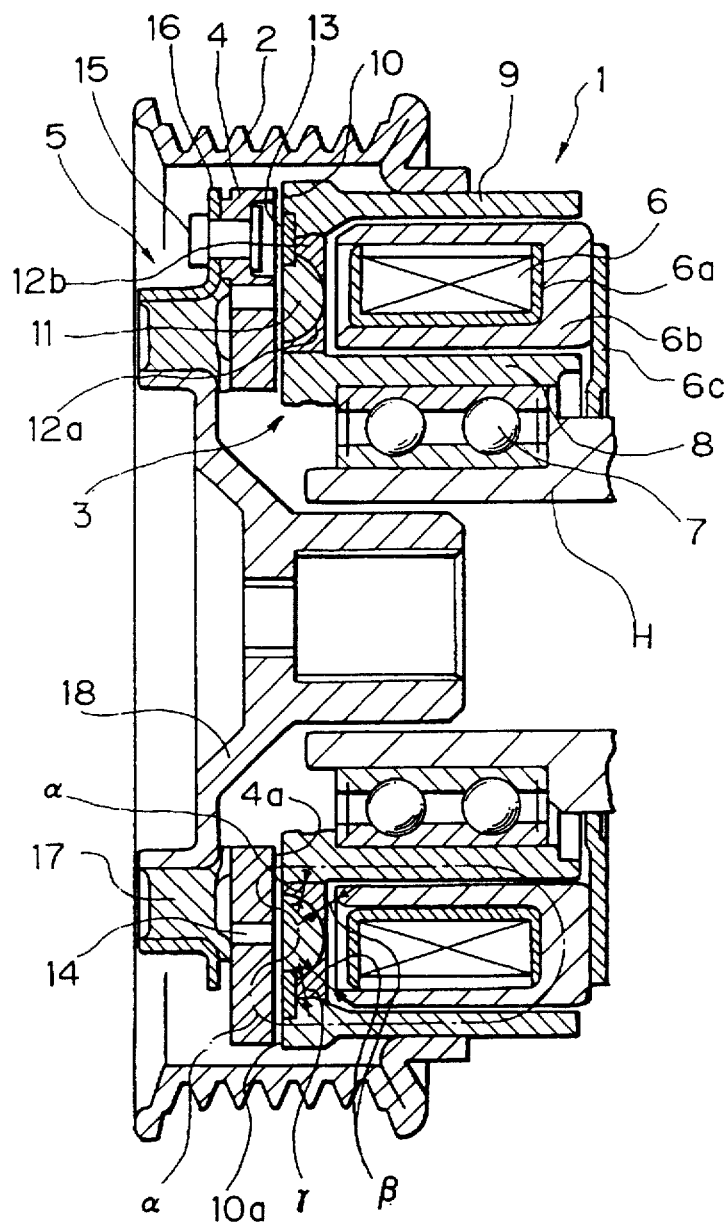
FIG. 2 is a cross-sectional view of the magnetic clutch manufactured according to the method of FIGS. 1A to 1G.

FIGS. 1 to 5 show the first embodiment of the present invention, and FIG. 2 shows the magnetic clutch manufactured according to the present invention.

As shown in FIG. 2, the magnetic clutch 1 is designed to operatively connect or disconnect the refrigeration system compressor to an engine (not shown). The magnetic clutch 1 generally comprises a rotor 3 having a pulley driven in rotation by the engine, a driven member 5 having an armature 4 frictionally engageable with the rotor 3, and a solenoid coil 6 generating a magnetic force causing the armature 4 to be frictionally engaged with the rotor 3 when a current is supplied to the solenoid coil 6. The solenoid coil 6 is held by a plastic holder 6a which in turn held by a stator 6b of a magnetic material, the stator 6b being fixed to a housing H of the compressor via a circular plate stay 6c.

The pulley 2 is welded to the outer surface of the rotor 2, and V-belts (not shown) can be wound around the pulley 2. The rotor 3 is rotatably supported by a bearing 7 arranged inside the rotor 3, and the inner portion of the bearing 7 is supported by the housing H of the compressor. The rotor 3 is manufactured from a magnetic metal material such as soft iron, and comprises an inner cylindrical wall 8 arranged inside the solenoid coil 6, an outer cylindrical wall 9 arranged outside the solenoid coil 6, and a friction wall (bottom wall) 10 frictionally engageable with the armature 4. The friction wall 10 includes a bottom portion 11 and magnetic flux blocking portions 12a and 12b arranged at the inner and outer circumferences of the bottom portion 11, respectively. The bottom portion 11 is formed as a circumferentially continuous projection having a generally circular arcuate cross-section on the top surface thereof on the side of the solenoid coil 6. The magnetic flux blocking portions 12a and 12b comprise a nonmagnetic material such as copper which connects the inner cylindrical wall 8 to the bottom portion 11, and the bottom portion 11 to the outer cylindrical wall 9, to prevent the formation of a magnetic circuit between the inner cylindrical wall 8 and the bottom portion 11, and between the bottom portion 11 and the outer cylindrical wall 9. A friction material 13 is embedded in a friction surface 10a of the friction wall 10 at an outer portion thereof.

Figure 3A:
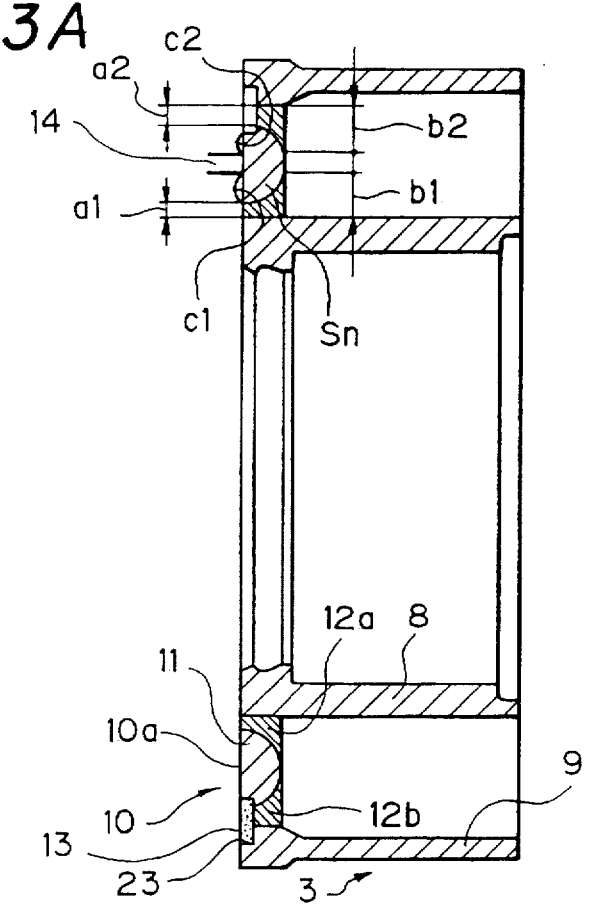
FIG. 3A is a cross-sectional view of the rotor.
Figure 3B:
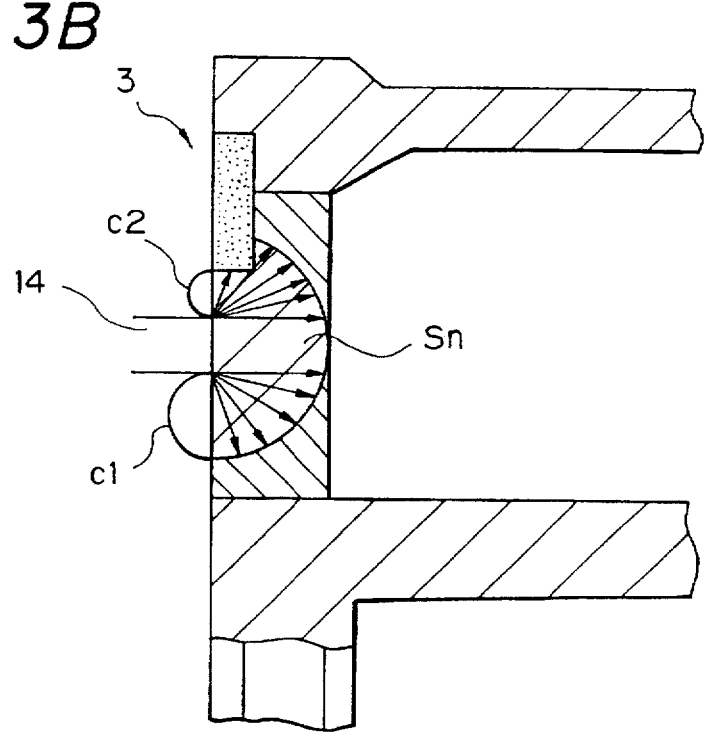
FIG. 3B is a partially enlarged cross-sectional view of the rotor of FIG. 3A.

Since the bottom portion 11 is formed as a circumferentially continuous projection having a generally circular arcuate cross-section on the side of the solenoid coil 6, the area (a1) of the inner magnetic flux blocking portion 12a on the side of the friction surface 10a is smaller than the area (b1) of the inner magnetic flux blocking portion 12a on the side of the solenoid coil 6, as shown in FIGS. 3A and 3B. Also, the area (a2) of the outer magnetic flux blocking portion 12b on the side of the friction surface 10a is smaller than the area (b2) of the outer magnetic flux blocking portion 12b on the side of the solenoid coil 6 is located. That is, there are the relationships of a1<b1 and a2<b2.

The armature 4 is arranged in a facing relationship with the rotor 3 with a gap therebetween, and has a friction surface 4a to be engaged with the rotor 3. The armature 4 is a ring-shaped plate made of a magnetic material and has a ring groove 14 for blocking the magnetic flux.

The ring groove 14 is substantially located at the radial center of the facing bottom portion 11 of the rotor 3. The cross-sectional area (Sn) of the bottom portion 11 of the rotor 3 starting from the ring groove 14 of the armature 4 is larger than the area (c1) of the inner portion of the rotor 3 at the friction surface 10a starting from the ring groove 14, as shown in FIGS. 3A and 3B. The cross-sectional area (Sn) is also larger than the area (c1) of the outer portion of the rotor 3 at the friction surface 10a starting from the ring groove 14, as shown in FIGS. 3A and 3B. That is, there are the relationships of Sn>c1 and Sn><c2. Accordingly, it is possible to reduce the magnetic resistance at the bottom portion 11.

The driven member 5 rotates with the armature 4 to drive the input shaft of the compressor, and for this purpose, the driven member 5 comprises an outer ring 16 fixed to the armature 4 by the rivets 15, rubber cushions 17 allowing the armature 4 to axially move, and an inner hub 18 to be fitted on the input shaft of the compressor. The outer ring 16 is integrally connected to the inner hub 18 by the rubber cushions 17.

The method for manufacturing the rotor 3 is now described with reference to FIGS. 1A to 1G. A plate of a magnetic material (for example, low carbon steel such as SPCC or SPHC) is prepared, the plate having a thickness substantially identical to the thickness of the friction wall 10 of the rotor 3. The plate is formed by, punching, into a ring shaped element 19a having a central hole and a circular periphery, as shown in FIG. 1A. A portion of the ring-shaped plate 19a is shown in FIG. 1B.

The ring-shaped plate 19a is then bent or deformed, by cold forging which is one of plastic deformation processes, so that a radially intermediate and circumferentially continuous portion of the ring-shaped plate 19a sinks toward the bottom surface to provide a curved ring-shaped element 19b, as shown in FIG. 1C.

The ring-shaped element 19b is further bent or deformed, by cold forging, such that a circumferentially continuous projection 20a having a generally circular arcuate cross-sectional shape is formed on the top surface of the element 19b at a radially central area in the curved portion, and circumferentially continuous projections 20b are formed on the bottom surface of the element 19b at both sides of the arcuate projection 20a, as shown in FIG. 1D.

The ring-shaped element 19b is further bent or deformed, by cold forging, such that a radially inner portion of the ring-shaped element 19b inside the inner projection 20b and a radially outer portion of the ring-shaped element 19b outside the outer projection 20b are bent, respectively, into generally concentric cylindrical shapes, as shown in FIG. 1E.

Accordingly, a contoured ring-shaped element 19 is formed, comprising inner and outer concentric cylindrical walls 8 and 9, and a bottom portion 11 interconnecting the inner and outer cylindrical walls 8 and 9 and including the projections 20a and 20b. Two ring grooves 21a and 21b are formed on the top surface of the bottom portion 11 corresponding to the projections 20b, one ring groove 21a being located on the inner side of the semi-circular projection 20a and the other ring groove 21b on the outer side of the semi-circular projection 20a. These ring grooves 21a and 21b are intended to form the magnetic flux blocking portions 12a and 12b. These grooves 21a and 21b have a divergent cross-sectional shape diverging toward the open top of the ring-shaped element 19, since the projection 20a has a circular arcuate cross-sectional shape. The inner ring groove 21a is deeper than the outer ring groove 21.

A nonmagnetic material 22 such as copper, in the form of a wire ring, is placed on the bottom portion 11 of the ring-shaped element 19, and the nonmagnetic ring 22 is melted in the ring-shaped element 19, as shown in FIG. 1F. The molten nonmagnetic material is shown by the numeral 12. The nonmagnetic ring 22 has a melting point lower than that of the ring-shaped element 19, and the nonmagnetic ring 22 is melted in the ring-shaped element 19 by heating the ring-shaped element 19. The molten nonmagnetic material 12 thus flows into the ring grooves 21a and 21b in the bottom portion 11. The ring-shaped element 19 is then cooled and the molten nonmagnetic material 22 is also cooled and solidified. The nonmagnetic material 12 diffuses in and is strongly joined to the ring-shaped element 19 due to a diffused junction of the nonmagnetic material 12 (copper, for example) with the ring-shaped element 19 (iron, for example).

The nonmagnetic material 12 may be, for example, bronze comprising copper and 5% weight of tin, and in this case, it is necessary to heat the ring-shaped element 19 containing the nonmagnetic ring 22 to approximately to 1,080° C.

The heating and cooling process of the ring-shaped element 19 and the nonmagnetic material 22 or 12 is carried out in a vacuum, or in an inert gas (such as nitrogen gas) environment to prevent oxidation of the ring-shaped element 19 and the nonmagnetic material 22 or 12.

In this embodiment, the nonmagnetic material 22 is in the form of a wire ring, but the nonmagnetic material 22 may be of any form, such as pellets or powders.

Figure 4:
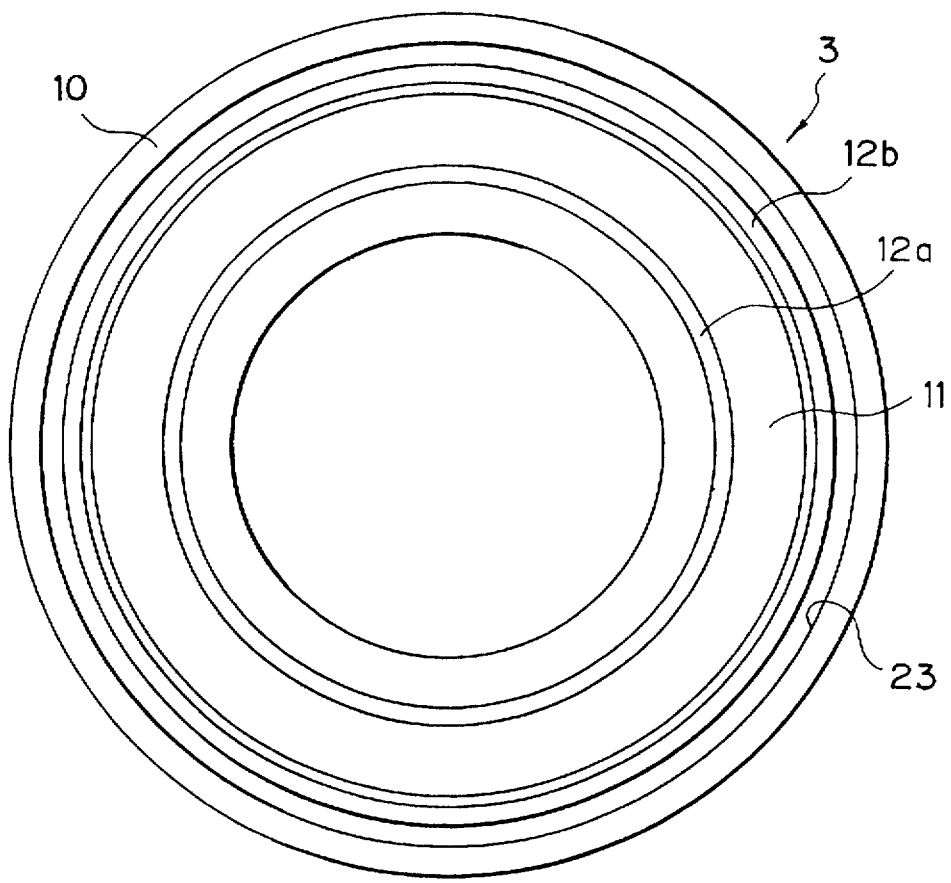
FIG. 4 is a front view of the rotor prior to joining a nonmagnetic material thereto.

The ring-shaped element 19 is then finished by machining or cutting the inner and outer cylindrical surfaces and the top and bottom surfaces thereof (the semi-broken lines show the profile before cutting), as shown in FIG. 1G. The cutting of the bottom surface is especially important in this process. The bottom surface of the bottom portion 11 is cut to form a friction surface 10a of the finished rotor 3 and the cutting is carried out such that the nonmagnetic material 22 is exposed at the friction surface 10a. In this embodiment, the bottom of the inner deeper ring groove 21a is removed with the material of the bottom portion 11 and the nonmagnetic material 22 therein is exposed at the friction surface 10a to function as the magnetic flux blocking portion 12a. A bottom ring groove 23 is formed on the friction surface 10a at a position corresponding to the outer ring groove 21b, and the friction material 13 (FIG. 2) is then fitted in the groove 23 on the friction surface 10a. This friction wall 10 is also shown in FIG. 4.

The operation of the magnetic clutch 1 having the thus manufactured rotor 3 mounted thereto is briefly described.

When a current is supplied to the solenoid coil 6, the latter generates a magnetic force causing the rotor 3 to attract the armature 4. A magnetic circuit is established, as shown by the semi-broken line α in FIG. 2, and the armature 4 is strongly attracted to the friction surface 10a of the rotor 3, resulting that the armature 4 can conjointly rotate with the rotor 3. As a result, the rotational driving power of the engine is transmitted to the input shaft of the compressor of the refrigerating system via the V-belts, the pulleys, the rotor 3, the armature 4 and the driven member 5.

In the method for manufacturing the rotor 3 of the magnetic clutch 1 according to the first embodiment of the present invention, the contoured ring-shaped element 19 comprising inner and outer concentric cylindrical walls 8 and 9, and the bottom portion 11, is obtained by bending the single ring-shaped plate 19a. Therefore, there are no parts to be assembled in the rotor 3, and it is not necessary to finish the internal surface of the rotor 3. Thus the time and cost for manufacturing the rotor 3 can be reduced.

The nonmagnetic material 12 molten on the bottom portion 11 of the ring-shaped element 19 flows in the trough-shaped bottom of the ring-shaped element 19 having one piece structure, and does not spill out of the ring-shaped element 19. Therefore, it is possible to prevent a defect in the rotor otherwise arising from a leakage of the molten nonmagnetic material 12 out of the bottom portion 11.

Since the magnetic flux blocking portions 12a and 12b are formed, not by punching slits, but by bending, it is possible to realize the rotor 3 having a smaller size than the conventional rotor 102 which includes magnetic flux blocking portions in form of slits punched out in a press. For example, when the magnetic flux blocking portions are slits punched out in a press, it is necessary that the spacing between the magnetic flux blocking portions is at least 0.6 times the thickness of the wall of the bottom portion. However, in this embodiment, the spacing between the magnetic flux blocking portions can be reduced to approximately 0.3 times of the thickness of the wall of the bottom portion, and thus the size of rotor 3 can be correspondingly reduced.

The magnetic flux blocking portion 12a completely magnetically separates the inner cylindrical wall 8 from the bottom portion 11, and the magnetic flux blocking portion 12b completely magnetically separates the bottom portion 11 from the outer cylindrical wall 9. Accordingly, there is no loss in a magnetic force and a high quality rotor 3 can be obtained.

Since the bottom portion 11 includes the circumferentially continuous projection 20a having a circular arcuate cross-sectional one side of the solenoid coil 6, a large distance (β in FIG. 2) is ensured between the inner and outer ends of the stator 6b of the solenoid coil 6 and the corresponding inner and outer ends of the bottom portion 11, respectively. Therefore, it is possible to reduce a loss in the transmitting torque which may be caused by the magnetic flux directly leaking from the stator 6b to the bottom portion 11.

Since the bottom portion 11 includes the circumferentially continuous projection 20a having a circular arcuate cross-sectional shape on the side of the solenoid coil 6, a sufficient average distance (γ in FIG. 2) is ensured between the inner cylindrical wall 8 and the bottom portion 11, and the bottom portion 11 and the outer cylindrical wall 9, respectively, to reduce a loss in the transmitted torque due to leakage of a magnetic flux between the inner cylindrical wall 8 and the bottom portion 11, and the bottom portion 11 and the outer cylindrical wall 9, respectively.

Since the bottom portion 11 includes the circumferentially continuous projection 20a having a circular arcuate cross-sectional shape on the side of the solenoid coil 6, it is possible to use a die having a sufficient thickness for forming the ring grooves 21a and 21b for constituting the magnetic flux blocking portions 12a and 12b. Therefore, it is possible to reduce a stress applied to the die, and thus to ensure the prolonged life of the die. As result, it is possible to reduce the manufacturing cost of the rotor 3.

Since the bottom portion 11 includes the circumferentially continuous projection 20a having a circular arcuate cross-sectional shape on the side of the solenoid coil 6, a joining area between the bottom portion 11 and the nonmagnetic material 12 can be broadened, and a sufficient joining force is ensured.

Also, according to the manufacturing method of the first embodiment, the projections 20a and 20b, and the grooves 21a and 21b are simultaneously formed by bending the walls, it is not necessary to use tools such as a punch.

Figure 5A:
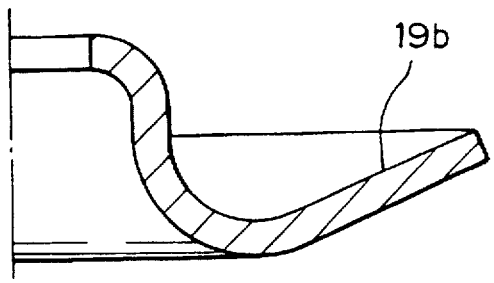
FIGS. 5A to 5C are views illustrating the steps of a method for manufacturing a rotor according to the second embodiment.
Figure 5B:
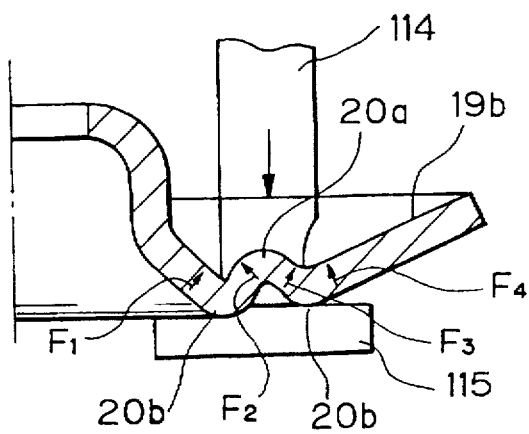
Figure 5C:
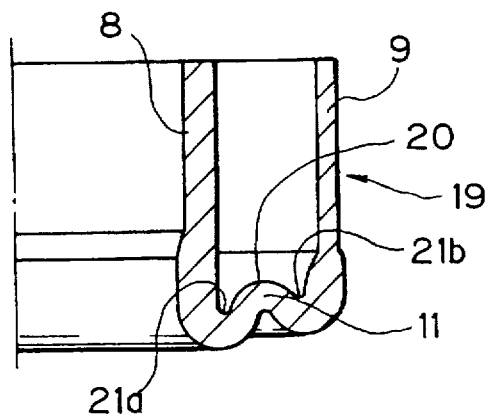

FIGS. 5A to 5C show several steps of the method for manufacturing the rotor 3 according to the second embodiment of the present invention. These steps correspond to the steps of FIGS. 1C to 1E, and the remaining steps of FIGS. 1A, 1B, and 1F, and 1G are also applicable to the second embodiment.

In this embodiment, the ring-shaped plate 19a is bent or deformed, by cold forging which is one of plastic deformation processes, so that a radially intermediate and circumferentially continuous portion of the ring-shaped plate 19a sinks towards the bottom surface to obtain the radially curved ring-shaped element 19b, as shown in FIG. 5A.

The ring-shaped element 19b is further bent or deformed, by coining using an upper die or punch 114 and a lower die 115, as shown in FIG. 5B. The lower die 115 is stationary and the punch 114 is driven to the ring-shaped element 19b at a radially central position in the curved intermediate portion to form the circumferentially continuous projection 20a having a generally circular arcuate cross-sectional shape on the top surface of the element 19b and the circumferentially continuous projections 20b on the bottom surface of the element 19b. The ring-shaped element 19b is further bent or deformed, by cold forging, into the ring-shaped element 19 comprising inner and outer concentric cylindrical walls 8 and 9, and the bottom portion 11 interconnecting the inner and outer cylindrical walls 8 and 9, as shown in FIG. 5C. Two ring grooves 21a and 21b are formed on the top surface of the bottom portion 11.

In this method, when the punch 114 is driven into the ring-shaped element 19b, the punch 114 receives reaction forces $F_1$ to $F_4$ so that the wall of the ring-shaped element 19b constrain the punch 114. The forces $F_2$ and $F_3$ balance to each other and do not greatly affect the punch 114. The forces $F_1$ and $F_4$ are weak and do not greatly affect the punch 114. Accordingly, it is possible to smoothly retract the punch 114 with less restraining resistance by the once processed wall and the prolonged life of the punch will be ensured during repeated use.

Figure 6A:
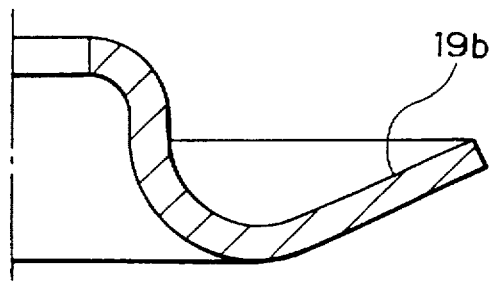
FIGS. 6A to 6C are views illustrating the steps of a method for manufacturing a rotor according to the third embodiment.
Figure 6B:
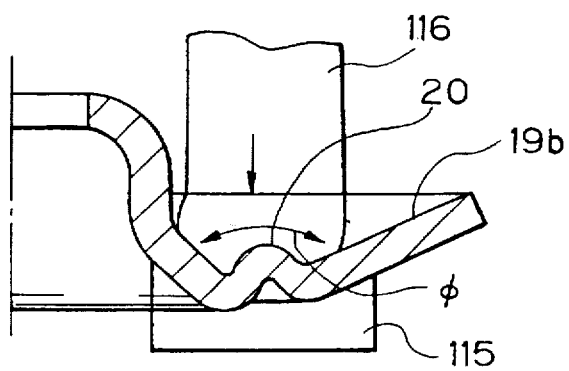
Figure 6C:
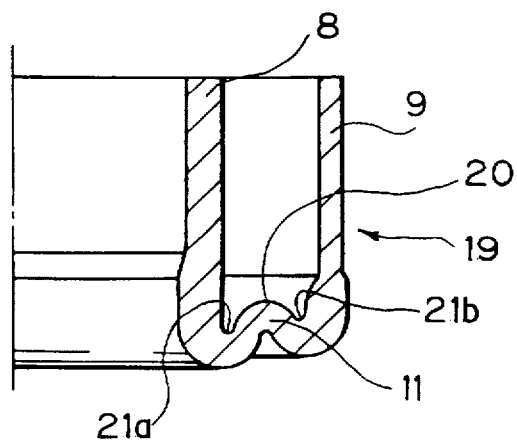

FIGS. 6A to 6C show several steps of the method for manufacturing the rotor 3 according to the third embodiment of the present invention, similar to the steps of FIGS. 5A to 5C. This embodiment uses a larger punch 116 than the punch 114 of FIG. 5B. In this case too, the punch 116 receives reaction forces $F_1$ to $F_4$, but they are weak. Especially, the forces $F_1$ and $F_4$ are weak and do not greatly affect the punch 116 because the angle φ in the sunk portion of the ring-shaped element 19b is greater than 90 degrees, for example. Accordingly, it is possible to smoothly retract the punch 114 and the prolonged life of the punch 116 will be ensured during repeated use.

Figure 7A:
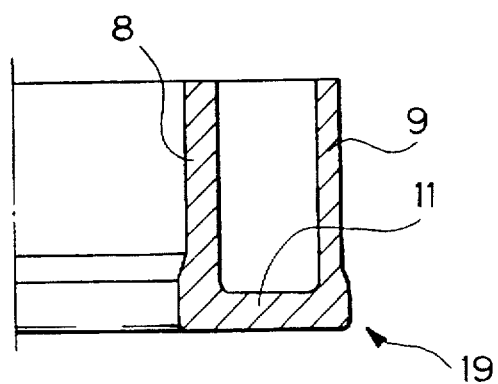
FIGS. 7A and 7B are views illustrating the steps of a method for manufacturing a rotor according to the fourth embodiment.
Figure 7B:
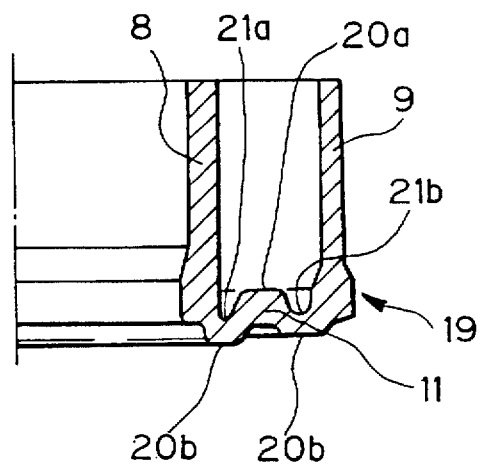

FIGS. 7A and 7B show two steps of the method for manufacturing the rotor 3 according to the fourth embodiment of the present invention. These steps are similar to the steps of FIGS. 1C to 1E, except that the order of the steps are changed. The remaining steps of FIGS. 1A, 1B and 1F, and 1G are also applicable to the fourth embodiment.

In this embodiment, the ring-shaped plate 19a is bent or deformed, by cold forging which is one of plastic deformation processes, into the ring-shaped element 19 comprising generally concentric inner and outer cylindrical walls 8 and 9, and the ring-shaped bottom wall 11 interconnecting the inner and outer cylindrical walls 8 and 9, as shown in FIG. 7A. The circumferentially continuous ring grooves 21a and 21b are then formed on the top surface of the bottom wall 11, corresponding to the projections 20a and 20b, as shown in FIG. 7B.

Figure 8A:
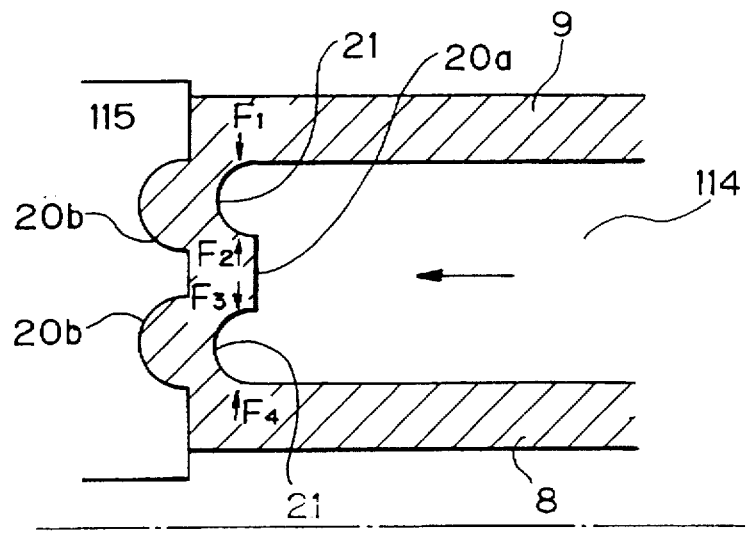
FIG. 8A is a diagrammatic view illustrating one of the steps of a method for manufacturing a rotor according to the fifth embodiment.
Figure 8B:
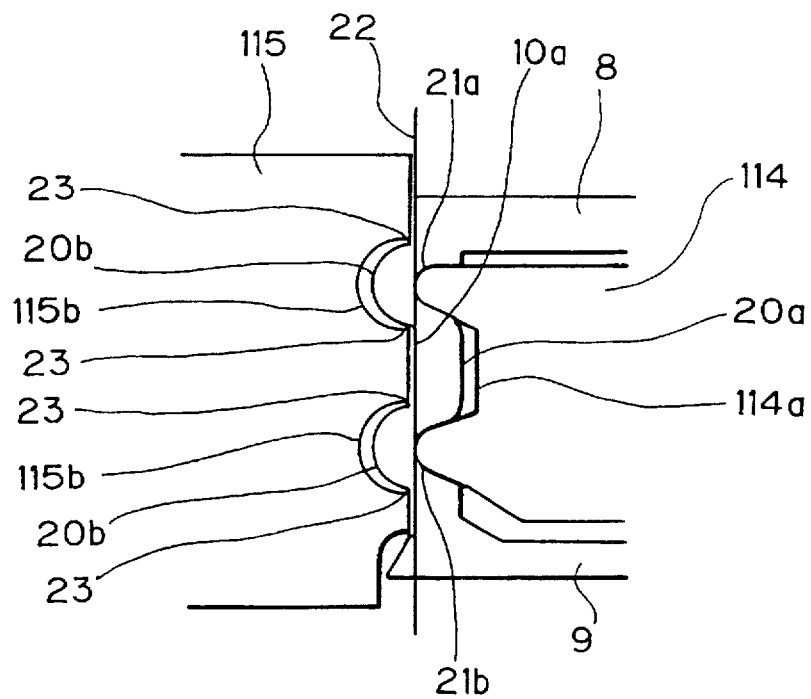
FIG. 8B is a view similar to, but somewhat more practical than, FIG. 8A.

FIGS. 8A and 8B show the fifth embodiment, similar to the fourth embodiment. FIGS. 8A and 8B show the step of forming the ring grooves 21a and 21b after the ring-shaped plate 19a is bent or deformed into the ring-shaped element 19. The ring grooves 21a and 21b of FIG. 7B are formed by cold forging, but the ring grooves 21a and 21b of FIG. 8B are formed by coining, similar to the second embodiment. In this case too, when the punch 114 is driven into the ring-shaped element 19, the punch 114 receives reaction forces $F_1$ to $F_4$ so that the wall of the ring-shaped element 19b constrains the punch 114. The forces $F_2$ and $F_3$ balance to each other and do not greatly affect the punch 114. The forces $F_1$ and $F_4$ are also weak and do not greatly affect the punch 114, compared with the above described prior art, since the punch 114 is driven in the bottom of the U-shaped element 19 having integral and identically rigid inner and outer walls 8 and 9 and the both ends of the bottom of the U-shaped element 19 have identical rigidity, while the punch in the prior art is driven in the wall of the L-shaped element 109. Accordingly, it is possible to smoothly retract the punch 114 with less restraining resistance from the processed wall and a long life of the punch will be ensured during repeated use.

FIG. 8A diagrammatically shows the fifth embodiment and FIG. 8B more practically shows the fifth embodiment. FIG. 8B shows the instance of the coining process that the punch 114 just forms the projections 20a and 20b and the ring grooves 21a and 21b. As can be seen in FIG. 8B, the lower die 115 has sunk reliefs so that there is a gap between the tip of the projection 20b and the bottom of the portion 115b of the lower die 115 corresponding the projection 20b so as to prevent the bottom of the portion 115b of the lower die 115 from being subjected to repeated stresses in coining. The projections 20b contact the portion 115b of the lower die 115 at four contact regions 23. The projections 20b are thus formed in free shapes, but there is no problem even if the shape of the projections is free because the projections 20b are removed when the friction surface 10a is machined. Similarly, the die 115 of the upper die has sunk reliefs so that there is a gap between the tip of the projection 20a and the bottom of the portion 114a of the punch 114 for forming the projection 20a so as to prevent the bottom of the portion 114a of the punch 114 from being subjected to repeated stresses in coining.

Figure 9:
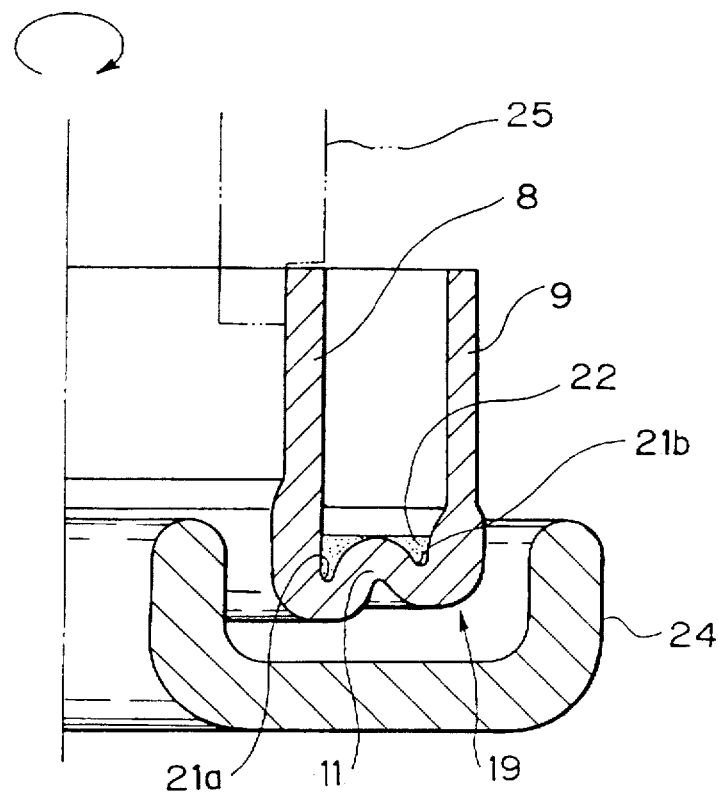
FIG. 9 is a view illustrating one of the steps of a method for manufacturing a rotor according to the sixth embodiment.

FIG. 9 shows one of the steps of the method for manufacturing the rotor 3 according to the sixth embodiment of the present invention. This step corresponds to the step of FIG. 1F of the first embodiment, i.e., the step of joining the nonmagnetic material 22 to the ring-shaped element 19. This embodiment can, of course, be combined with the remaining steps of the first embodiment or of the other embodiments.

The step of joining the nonmagnetic material 22 to the ring-shaped element 19 is carried out, by induction heating.

The nonmagnetic material 22 (copper, for example) in the form of powder is arranged in the ring grooves 21a and 21b in the bottom portion 11 of the ring-shaped element 19, the nonmagnetic material 22 having a melting point lower than that of the ring-shaped element 19 of a magnetic material (low carbon steel, for example). The ring-shaped element 19 is heated by an induction heating device 24. This induction heating device 24 has a U-shaped cross section to cover the lower portion of the ring-shaped element 19 and causes an induction current in the ring-shaped element 19 to thereby heat the ring-shaped element 19. The nonmagnetic material 22 is molten by heating the ring-shaped element 19 by the induction heating device 24, and the molten nonmagnetic material 22 is then solidified in the ring-shaped element 19 by cooling the ring-shaped element 19. During this solidification, the nonmagnetic material 22 diffuses into and is joined to the ring-shaped element 19, and the ring-shaped element 19 is strongly joined to the nonmagnetic material 12 (FIG. 1F) comprised of the nonmagnetic material 22.

The ring-shaped element 19 is held by a chuck 25 and driven in rotation during heating and cooling the ring-shaped element 19. By this rotation of the ring-shaped element 19, any variation in the melting and solidifying conditions of the nonmagnetic material 22 are minimized and the defect of the product such as an insufficient joining are prevented. Although the bottom portion 11 of the ring-shaped element 19 is entirely covered and heated by the induction heating device 24 in the embodiment, it is possible to arrange an induction device so as to locally heat a portion of the bottom portion 11 of the ring-shaped element 19 and to cause the ring-shaped element 19 to be rotated by the chuck 25 so that the bottom portion 11 of the ring-shaped element 19 can be entirely heated.

It is possible to mix an oxidation preventing flux in the nonmagnetic material 22 or to apply an oxidation preventing flux to the ring grooves 21a and 21b, for preventing the joined portions from being oxidized. By this measure, it is not necessary to carry out the joining process in a vacuum or in an inert gas environment to ensure the highly strong joint, and it is possible to reduce the manufacturing cost. However, it is possible to blow an inert gas to the ring-shaped element 19 as desired since the oxidation of the ring-shaped element 19 cannot be prevented.

The nonmagnetic material 22 in the form of powder is used in this embodiment, but it is possible to use the nonmagnetic material 22 in the form of a wire ring or pellets.

Figure 10:
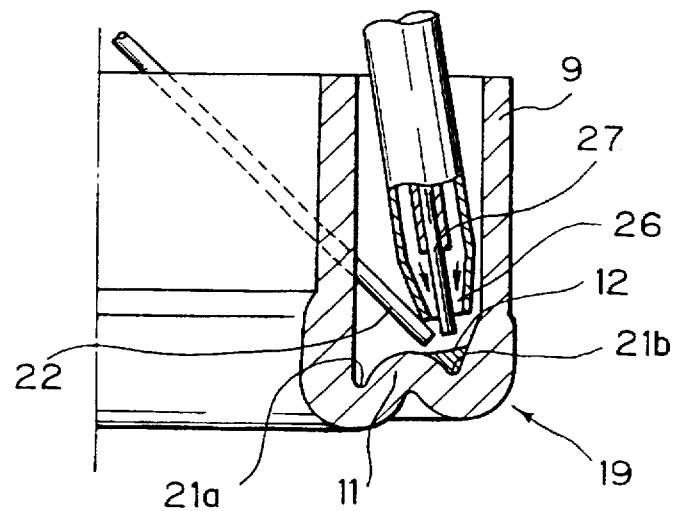
FIG. 10 is a view illustrating one of the steps of a method for manufacturing a rotor according to the seventh embodiment.

FIG. 10 shows one of the steps of the method for manufacturing the rotor 3 according to the seventh embodiment of the present invention. This step corresponds to the step of FIG. 9 in the previous embodiment, for melting the nonmagnetic material 22 and joining to the ring-shaped element 19. In FIG. 10, the nonmagnetic material 22 is applied to the outer ring groove 21b.

The embodiment uses a TIG welding (tungsten inert gas arc welding) as an example of means for melting the nonmagnetic material 22 and filling the ring grooves 21a and 21b with the nonmagnetic material 22. TIG welding device includes a nozzle 26 and a tungsten electrode 27. An inert gas such as argon or helium is blown from the nozzle 26 and a high voltage is applied between the tungsten electrode 27 and the ring-shaped element 19 to generate an arc therebetween to melt the nonmagnetic material 22 in the form of a rod. The molten nonmagnetic material 22 is filled in the ring groove 21a or 21b to join the nonmagnetic material 22 to the ring-shaped element 19 in the ring groove 21a or 21b.

Figure 11:
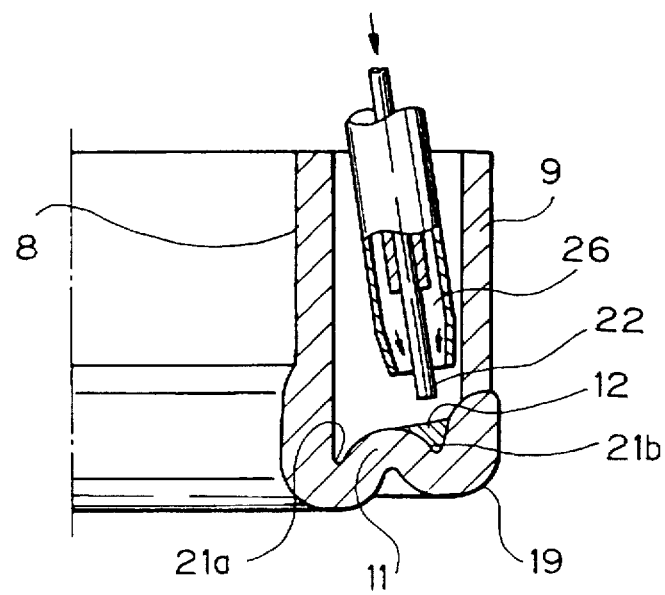
FIG. 11 is a view illustrating one of the steps of a method for manufacturing a rotor according to the eighth embodiment.

FIG. 11 shows the eighth embodiment of the present invention. This step corresponds to the step of FIG. 10 in the previous embodiment, for melting the nonmagnetic material 22 and joining the nonmagnetic material 22 to the ring-shaped element 19. The embodiment uses a MIG welding (metal inert gas arc welding) as an example of means for melting the nonmagnetic material 22 and filling the ring grooves 21a and 21b with the nonmagnetic material 22. In FIG. 11, the nonmagnetic material 22 is applied to the outer ring groove 21b.

MIG welding device includes a nozzle 26 from which an inert gas is blown toward the welding object, i.e., the ring groove 21a or 21b. A high voltage is applied between an electrode consisting of the nonmagnetic material 22 in the form of a rod and the ring-shaped element 19 to generate an arc therebetween to melt the nonmagnetic material 22. The molten nonmagnetic material 22 is filled in the ring groove 21a or 21b to join the nonmagnetic material 22 to the ring-shaped element 19 in the ring groove 21a or 21b. The nonmagnetic material 22 being the electrode consisting is continuously supplied.

Figure 12:
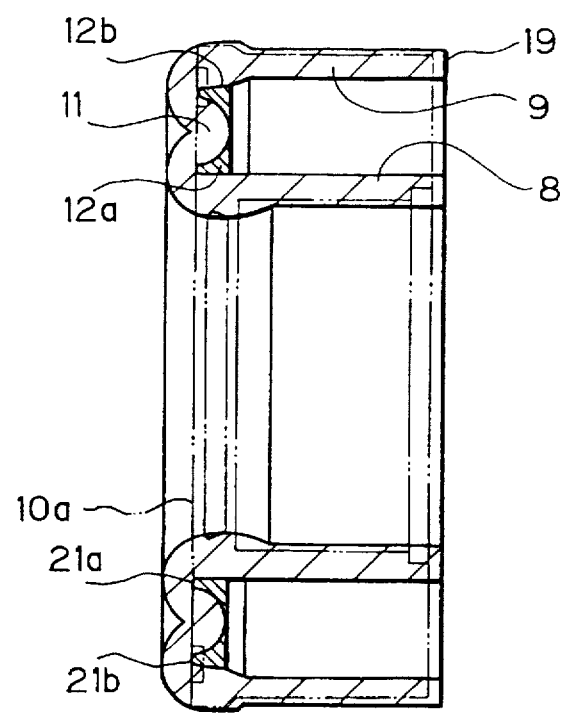
FIG. 12 is a view illustrating one of the steps of a method for manufacturing a rotor according to the ninth embodiment.

FIG. 12 shows one of the steps of the method for manufacturing the rotor 3 of the magnetic clutch 1 according to the ninth embodiment of the present invention. This step corresponds to the step of FIG. 1E. One ring groove 21a located inside the semi-circular projection 20a was deeper than the other ring groove 21b outside the semi-circular projection 20a in FIG. 1E. In FIG. 12, the depth of the inner ring groove 21a is made substantially equal to that of the outer ring groove 21b in the groove forming step, and in the subsequent machining step, the bottom surface of the bottom portion 11 is cut so that the nonmagnetic material 22 is exposed at the friction surface 10a. This can be applied to the other embodiments.

FIGS. 13A to 13H show the method for manufacturing the rotor 3 of the magnetic clutch 1 according to the tenth embodiment of the present invention. The steps shown in FIGS. 13A to 13E are described here briefly because they are similar to the steps of the heretofore described embodiments.

Figure 13A:
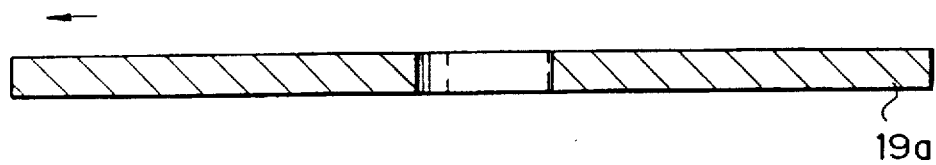
FIGS. 13A to 13H are views illustrating the steps of a method for manufacturing a rotor according to the tenth embodiment.
Figure 13B:
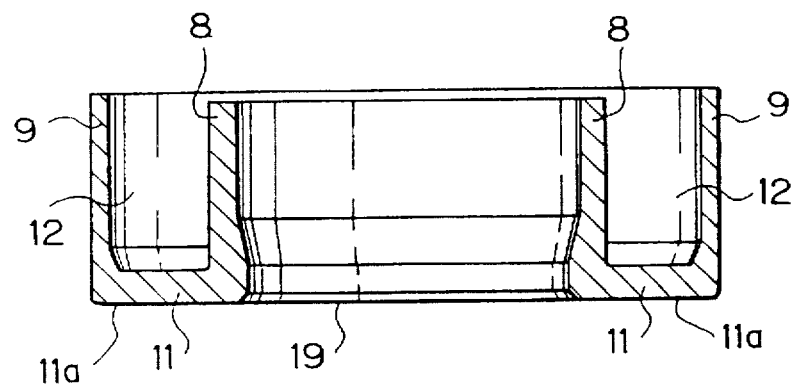
Figure 13C:
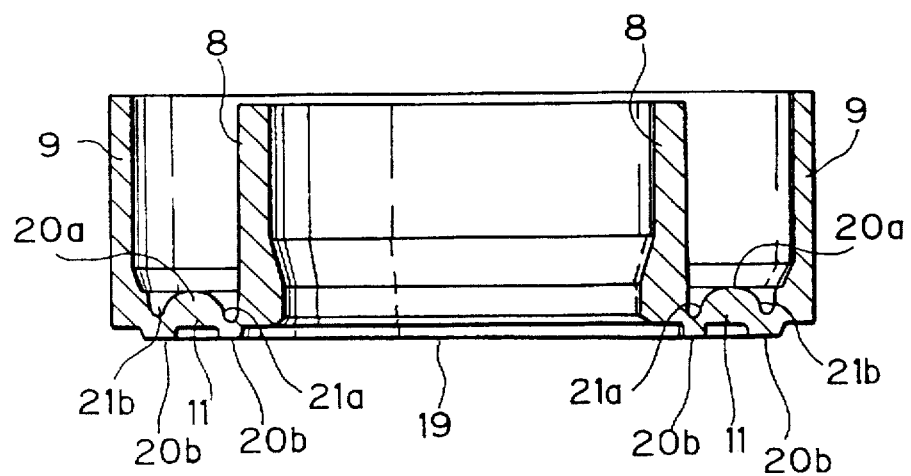
Figure 13D:
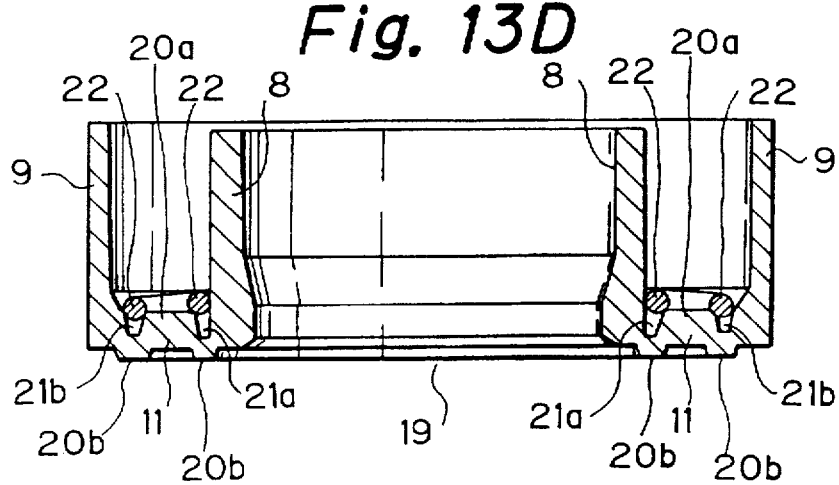
Figure 13E:
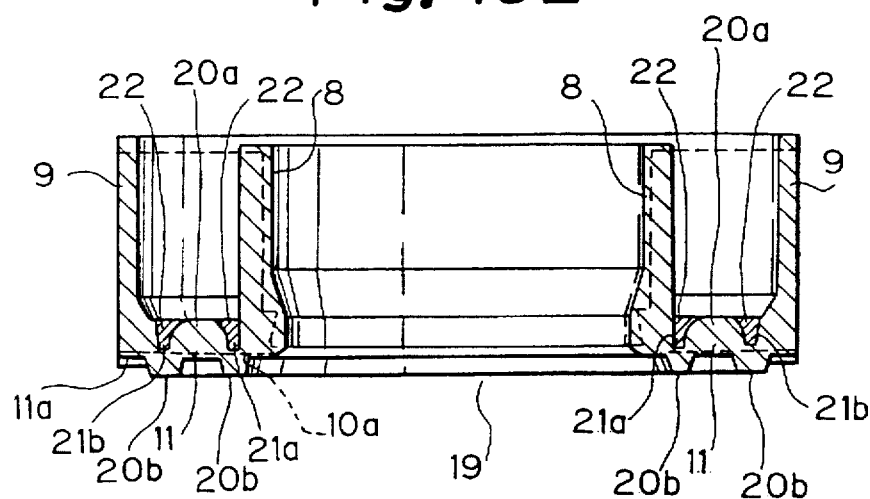
Figure 14:
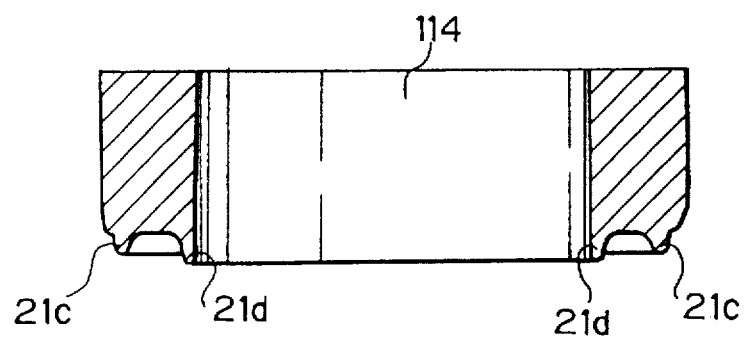
FIG. 14 is a view of a punch used in the step of FIG. 13C.

A ring-shaped plate 19A is prepared (FIG. 13A) and the ring-shaped plate 19A is bent, by a plastic deformation process, into a ring-shaped element 19 comprising inner and outer concentric cylindrical walls 8 and 9, and a bottom portion 11 interconnecting the inner and outer cylindrical walls 8 and 9 (FIG. 13B). The bottom portion 11 has a bottom surface 11a. Two ring grooves 21a and 21b are formed on the top surface of the bottom portion 11, by forming the projections 20a and 20b (FIG. 13C). In this coining operation, a punch 114 having edges 21c and 21d is used (FIG. 14). A nonmagnetic material 22 is applied to the bottom of the ring-shaped element 19 (FIG. 13D), and the nonmagnetic material 22 is molten by heating the ring-shaped element 19 (FIG. 13E).

The ring-shaped element 19 is then finished by machining or cutting the inner and outer cylindrical surfaces and the top and bottom surfaces thereof. The cutting line is shown by the broken line in FIG. 13E. The cutting of the bottom surface is especially important in this embodiment too.

Figure 13F:
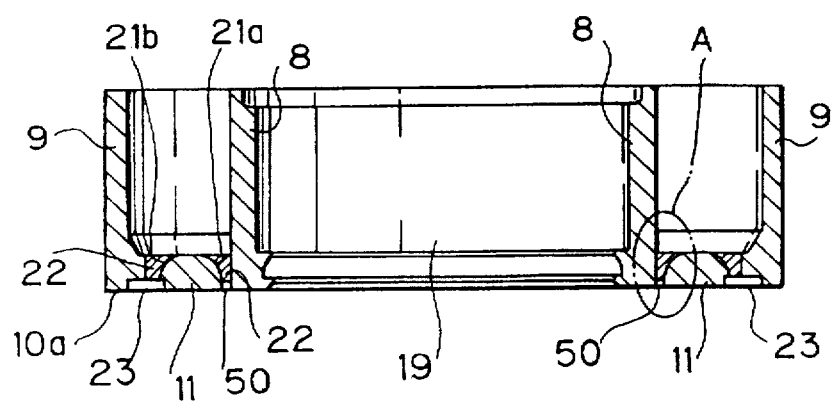
Figure 15:
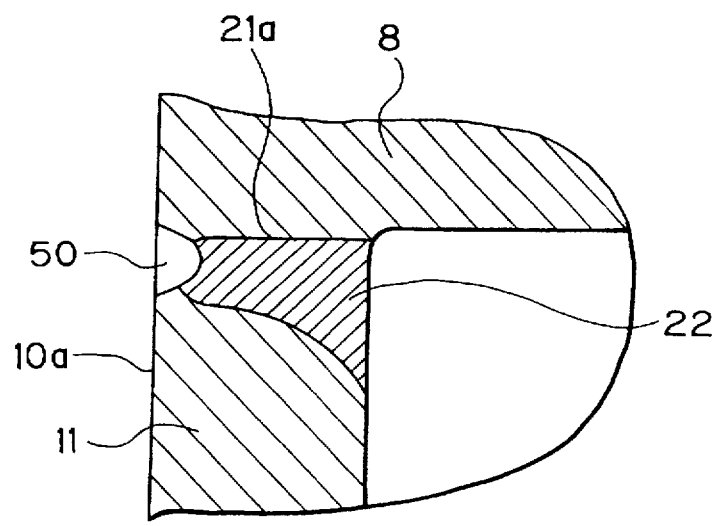
FIG. 15 is a partially enlarged view of the rotor of FIG. 13F.

The bottom surface of the bottom portion 11 is cut to form a friction surface 10a of the finished rotor 3 and, in this case, the cutting is carried out such that the nonmagnetic material 22 is not exposed at the friction surface 10a. Then, a bottom ring groove 50 is formed on a portion of the friction surface 10a corresponding to the location of the inner ring groove 21a so that the nonmagnetic material 22 in the inner ring groove 21a is exposed at the friction surface 10a, as shown in FIG. 13F. This is also shown in FIG. 15. A bottom ring groove 23 is also formed on the friction surface 10a at a position corresponding to the outer ring groove 21b, whereby the nonmagnetic material 22 is exposed from the friction surface 10a.

Figure 13G:
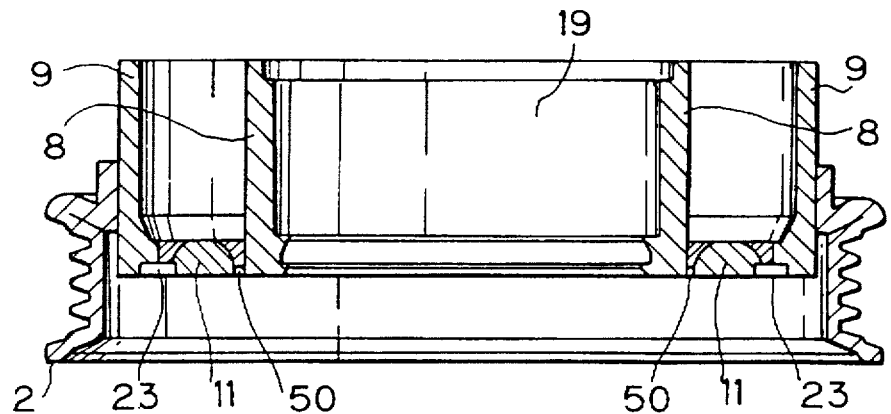
Figure 13H:
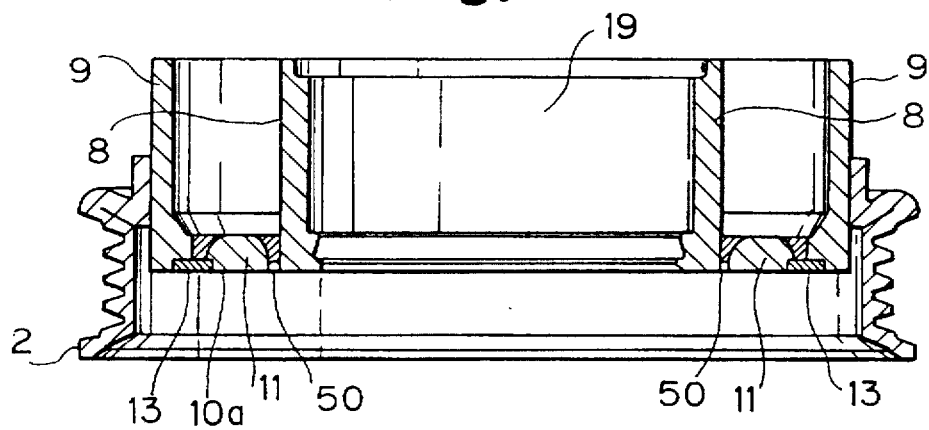

A pulley 2 for supporting V-belts is press fit and welded onto the ring-shaped element 19, as shown in FIG. 13G. A paint is then applied to the surface of the ring-shaped element 19 with the pulley 2. A friction material 13 is fit in the bottom ring groove 23 arranged on the friction surface 10a.

In the friction surface 10a, the width of the ring groove 50 measured in the radial direction of the ring-shaped element 19 is considerably smaller than that of the ring groove 23, so that a sufficient surface area for engaging with the armature 4 is ensured to provide a strong attraction force. Also, the armature 4 repeatedly and frictionally contacts the rotor 3 in use and a frictional heat occurs due to the friction between the armature 4 and the rotor 3. However, the nonmagnetic material 22 does not contact the armature 4 since the ring groove 50 exists, and so that nonmagnetic material 22 is not softened or welted by a frictional heat.

Figure 16:
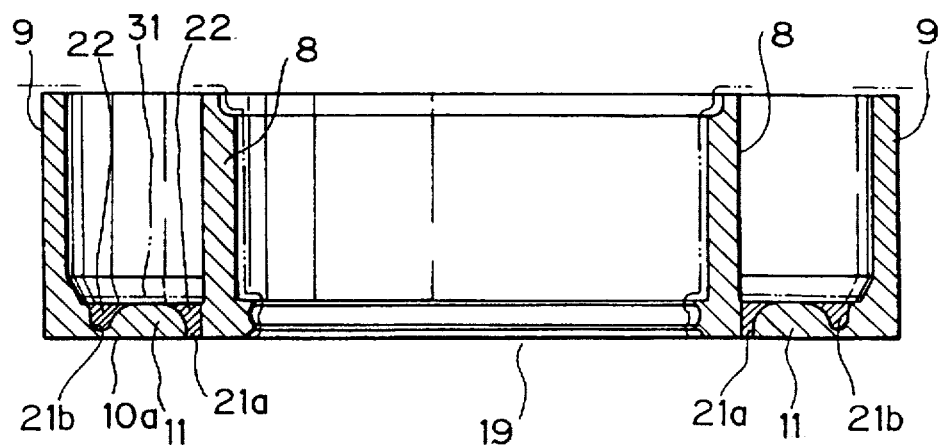
FIG. 16 is a view illustrating one of the steps of a method for manufacturing a rotor according to the eleventh embodiment.
Figure 17:
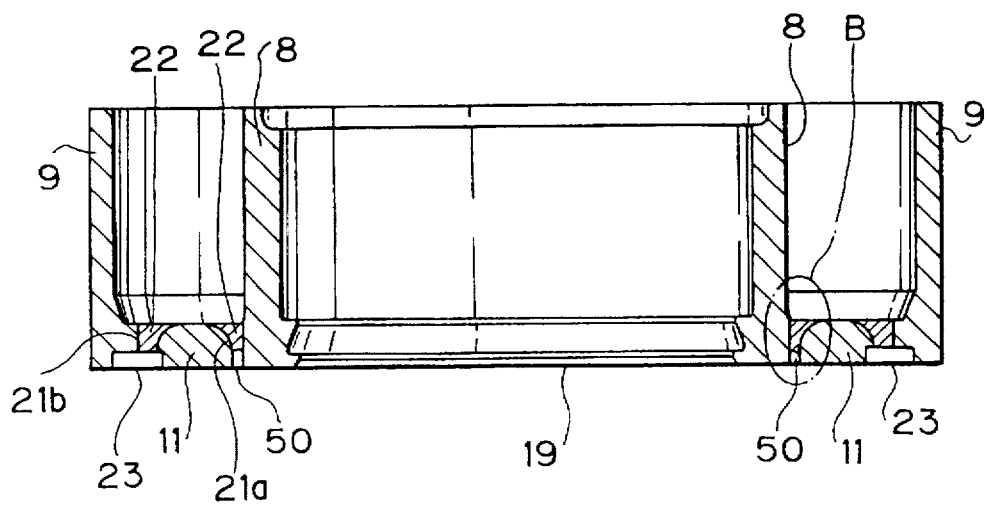
FIG. 17 is a view illustrating the step after the step of FIG. 16.

FIGS. 16 and 17 show the eleventh embodiment. FIGS. 16 and 17 show the machining step, after the ring-shaped plate 19A (FIG. 13A) is bent into the ring-shaped element 19 comprising inner and outer concentric cylindrical walls 8 and 9, and the bottom portion 11 having the ring grooves 21a and 21b.

Figure 18:
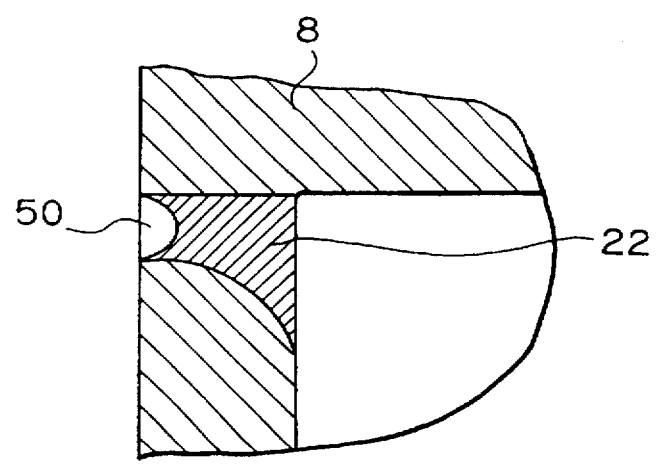
FIG. 18 is a partially enlarged view of the rotor of FIG. 16.
Figure 19:
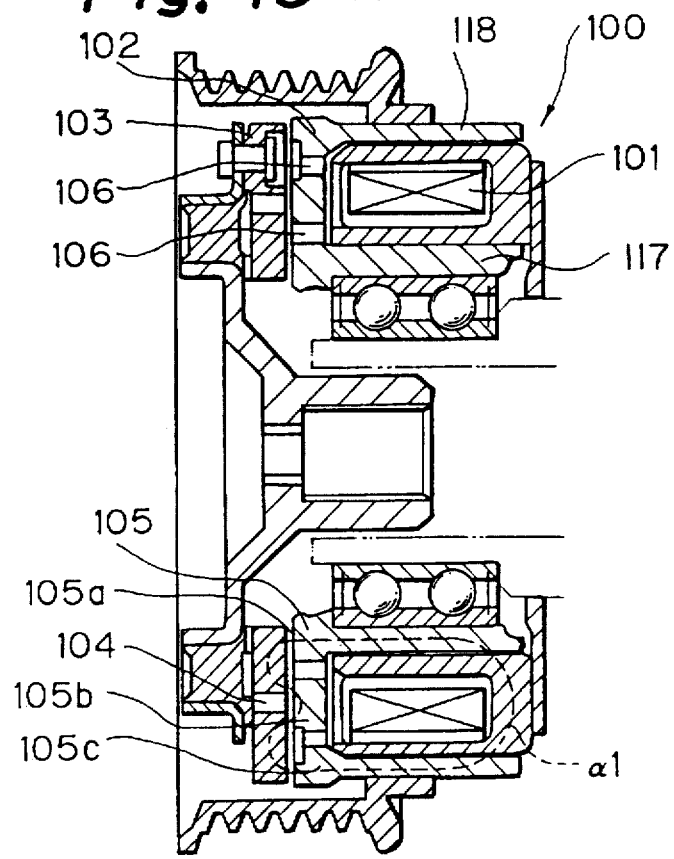
FIG. 19 is a cross-sectional view of a prior art magnetic clutch.
Figure 20:
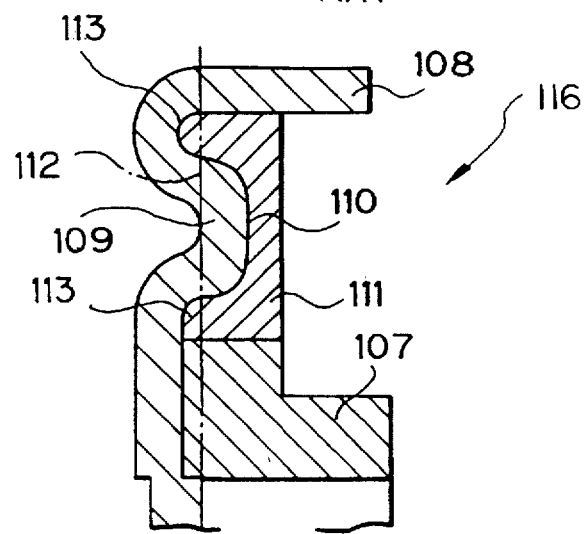
FIG. 20 is a cross-sectional view of a rotor of a further prior art magnetic clutch.
Figure 21:
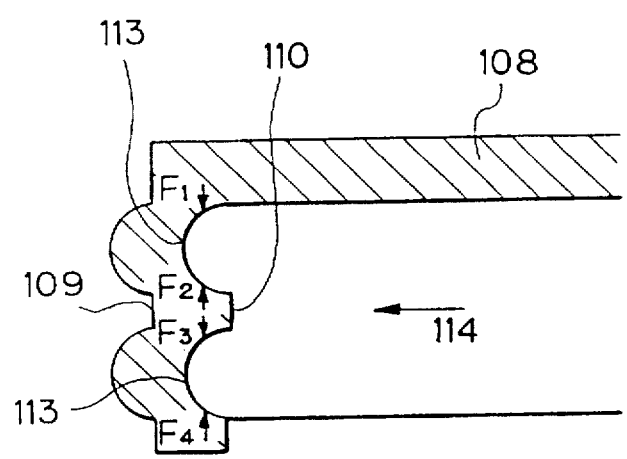
FIG. 21 is a view illustrating one of the problems associated with manufacturing the rotor of FIG. 20 by coining.

In this embodiment, the machining or cutting step of the ring-shaped element 19, the bottom surface of the bottom portion 11 is cut to form a friction surface 10a of the finished rotor 3 and the cutting is carried out such an amount that the nonmagnetic material 22 is exposed at the friction surface 10a, as shown in FIG. 16. In this case, the inner ring groove 21a is deeper than the outer ring groove 21b. Then, the bottom ring groove 50 is formed on a portion of the friction surface 10a corresponding to the location of the inner ring groove 21a so that the nonmagnetic material 22 in the inner ring groove 21a is exposed from the friction surface 10a, as shown in FIGS. 17 and 18. The bottom ring groove 23 is also formed on the friction surface 10a for receiving the friction material.

It will be understood that the machining or cutting step of the embodiments of FIGS. 1A to 12 can be replaced by the machining or cutting step of the embodiments of FIGS. 13A to 18.

In the above described embodiments, cold forging is typically used for bending the plate as a plastic deformation process. It is, however, possible to use other procedures such as pressing as a plastic deformation process.

In the coining step for forming the grooves, it is possible to arrange so that the upper die is stationary and the upper die is movable, although the lower die was stationary and the upper die was movable in the illustrated embodiments.

It is also possible to use other material than copper for the nonmagnetic material 22, for example, nonmagnetic metal such as aluminum or nonmagnetic plastic as desired. The ring-shaped element 19 was heated to allow the nonmagnetic material 22 to be molten in the illustrated embodiments, but it is possible, for example to use nonmagnetic metal such as stainless steel which is joined to the ring-shaped element 19 by a friction pressure welding method.

The projection 20a was formed in the circular arcuate cross-sectional shape, but it is possible to adopt other shapes such as a shape including tapers convergent toward the open top of the ring-shaped element or a rectangular shape.

The dimensional relationships in the embodiments are used by way of examples, and the present invention is not limited to those dimensional relationships.

Although the illustrated magnetic clutch was installed in the compressor in the refrigerating system, it is possible to use the magnetic clutch for all other applications such as a supercharger and an automatic transmission for selectively transmitting and disconnecting the power.

We claim:

1. A method for manufacturing a rotor of a magnetic clutch, the method comprising the steps of:

forming a ring-shaped plate of a magnetic material, the ring-shaped plate having a central hole and an outer periphery;

deforming the ring-shaped plate, by a plastic deformation process, into a ring-shaped element having generally concentric inner and outer cylindrical walls, and a ring-shaped bottom wall disposed between the inner and outer cylindrical walls, the bottom wall having a top surface and a bottom surface on a side opposite to the top surface, a portion of the bottom wall being deformed by coining using a pair of punches to form inner and outer ring grooves on the top surface, wherein the step of coining a portion of the bottom wall is not performed simultaneously with the step of deforming the ring-shaped plate into a ring-shaped element and wherein said outer ring groove is shallower than said inner ring groove when said inner and outer ring grooves are formed by coining;

joining a nonmagnetic material to the bottom wall in the ring grooves thereof;

cutting the bottom surface of the bottom wall to form a friction surface and to expose the nonmagnetic material at the friction surface, wherein a portion of the bottom wall between said inner and outer ring grooves is exposed as the friction surface;

cutting a portion of the bottom surface of the bottom wall at the position of said outer ring groove to form an outer bottom ring groove;

cutting a portion of the bottom surface of the bottom wall at the position of said inner ring groove to form an inner bottom ring groove; and filling a friction material into said outer bottom ring groove, wherein an air layer separates said nonmagnetic material in said inner ring groove from said friction surface adjacent said inner bottom ring groove.

2. A method according to claim 1, wherein one of said pair of punches used for said coining has inner and outer edges to form said inner and outer ring grooves, an outer circumferential surface, and a taper on said outer circumferential surface adjacent to said outer edge.

3. A method for manufacturing a rotor of a magnetic clutch, the method comprising the steps of:

forming a ring-shaped plate of a magnetic material, the ring-shaped plate having a central hole and an outer periphery;

deforming the ring-shaped plate, by a plastic deformation process, into a ring-shaped element having generally concentric inner and outer cylindrical walls, and a ring-shaped bottom wall disposed between the inner and outer cylindrical walls, the bottom wall having a top surface and a bottom surface on a side opposite to the top surface;

forming inner and outer circumferentially continuous ring grooves on the top surface of the bottom wall by coining using a pair of punches following the step of deforming the ring-shaped plate into a ring-shaped element, wherein said outer ring groove is shallower than said inner ring groove when said inner and outer ring grooves are formed by coining;

joining a nonmagnetic material to the bottom wall in the ring grooves thereof;

cutting the bottom surface of the bottom wall to form a friction surface and to expose the nonmagnetic material at the friction surface, wherein a portion of the bottom wall between said inner and outer ring grooves is exposed as the friction surface;

cutting a portion of the bottom surface of the bottom wall at the position of said outer ring groove to form an outer bottom ring groove;

cutting a portion of the bottom surface of the bottom wall at the position of said inner ring groove to form an inner bottom ring groove; and filling a friction material into said outer bottom ring groove, wherein an air layer separates said nonmagnetic material in said inner ring groove from said friction surface adjacent said inner bottom ring groove.

4. A method according to claim 3, wherein one of said pair of punches used for said coining has inner and outer edges to form said inner and outer ring grooves, an outer circumferential surface, and a taper on said outer circumferential surface adjacent to said outer edge.

5. A method for manufacturing a rotor of a magnetic clutch, the method comprising the steps of:

forming a ring-shaped plate of a magnetic material, the ring-shaped plate having a top surface, a bottom surface, a central hole, an outer periphery, and radially inner, intermediate, and outer portions between the central hole and the outer periphery;

forming inner and outer circumferentially continuous ring grooves on the top surface of the radially intermediate portion by coining using a pair of punches, wherein said outer ring groove is shallower than said inner ring groove when said inner and outer ring grooves are formed by coining;

bending the radially inner and outer portions of the ring-shaped plate relative to the radially intermediate portion, by a plastic deformation process, into a ring-shaped element having generally concentric inner and outer cylindrical walls, and a ring-shaped bottom wall disposed between the inner and outer cylindrical walls following the step of forming inner and outer circumferentially continuous ring grooves;

joining a nonmagnetic material to the bottom wall in the ring grooves thereof;

cutting the bottom surface of the bottom wall to form a friction surface and to expose the nonmagnetic material at the friction surface, wherein a portion of the bottom wall between said inner and outer ring grooves is exposed as the friction surface;

cutting a portion of the bottom surface of the bottom wall at the position of said outer ring groove to form an outer bottom ring groove;

cutting a portion of the bottom surface of the bottom wall at the position of said inner ring groove to form an inner bottom ring groove; and filling a friction material into said outer bottom ring groove, wherein an air layer separates said nonmagnetic material in said inner ring groove from said friction surface adjacent said inner bottom ring groove.

6. A method according to claim 5, wherein one of said pair of punches used for said coining has inner and outer edges to form said inner and outer ring grooves, an outer circumferential surface, and a taper on said outer circumferential surface adjacent to said outer edge.

7. A method for manufacturing a rotor of a magnetic clutch, the method comprising the steps of:

forming a ring-shaped plate of a magnetic material, the ring-shaped plate having a central hole and an outer periphery;

deforming the ring-shaped plate, by a plastic deformation process, into a ring-shaped element having generally concentric inner and outer cylindrical walls, and a ring-shaped bottom wall disposed between the inner and the outer cylindrical walls, the bottom wall having a top surface and a bottom surface on a side opposite to the top surface, a portion of the bottom wall being deformed by coining using a pair of punches to form inner and outer ring grooves on the top surface, wherein the step of coining a portion of the bottom wall is not performed simultaneously with the step of deforming the ring-shaped plate into a ring-shaped element and wherein said outer ring groove is shallower than said inner ring groove when said inner and outer ring grooves are formed by coining;

joining a nonmagnetic material to the bottom wall in the ring grooves thereof;

cutting the bottom surface of the bottom wall to form a friction surface such that the nonmagnetic material is not exposed at the friction surface; and exposing the nonmagnetic material by forming a bottom ring groove on a portion of the friction surface opposite the ring grooves on the top surface, wherein a portion of the bottom wall between said inner and outer ring grooves is exposed as the friction surface wherein the step of exposing the nonmagnetic material comprises cutting a portion of the bottom surface of the bottom wall at the position of said outer ring groove to form an outer bottom ring groove;

cutting a portion of the bottom surface of the bottom wall at the position of said inner ring groove to form an inner bottom ring groove; and filling a friction material into said outer bottom ring groove, wherein an air layer separates said nonmagnetic material in said inner ring groove from said friction surface adjacent said inner bottom ring groove.

8. A method according to claim 7, wherein one of said pair of punches used for said coining has inner and outer edges to form said inner and outer ring grooves, an outer circumferential surface, and a taper on said outer circumferential surface adjacent to said outer edge.

9. A method for manufacturing a rotor of a magnetic clutch, the method comprising the steps of:

forming a ring-shaped plate of a magnetic material, the ring-shaped plate having a central hole and an outer periphery;

deforming the ring-shaped plate by a plastic deformation process, into a ring-shaped element having generally concentric inner and outer cylindrical walls, and a ring-shaped bottom wall disposed between the inner and outer cylindrical walls, the bottom wall having a top surface and a bottom surface on a side opposite to the top surface, a portion of the bottom wall being deformed by coining using a pair of punches to form inner and outer ring grooves on the top surface, wherein the step of coining a portion of the bottom wall is not performed simultaneously with the step of deforming the ring-shaped plate into a ring-shaped element and wherein said outer ring groove is shallower than said inner ring groove when said inner and outer ring grooves are formed by coining;

joining a nonmagnetic material to the bottom wall in the ring grooves thereof;

cutting the bottom surface of the bottom wall to form a friction surface such that the nonmagnetic material is exposed at the friction surface;

forming an inner bottom ring groove in the exposed nonmagnetic material on the friction surface, wherein a portion of the bottom wall between said inner and outer ring grooves is exposed as the friction surface;

cutting a portion of the bottom surface of the bottom wall at the position of said outer ring groove to form an outer bottom ring groove; and filling a friction material into said outer bottom ring groove, wherein an air layer separates said nonmagnetic material adjacent said inner ring groove from said friction surface in said inner bottom ring groove.

10. A method according to claim 9, wherein one of said pair of punches used for said coining has inner and outer edges to form said inner and outer ring grooves, an outer circumferential surface, and a taper on said outer circumferential surface adjacent to said outer edge.

* * * * *

UNITED STATES PATENT AND TRADEMARK OFFICE
CERTIFICATE OF CORRECTION

PATENT NO. : 5,791,039
DATED : August 11, 1998
INVENTOR(S) : Tabuchi, et al

It is certified that error appears in the above-identified patent and that said Letters Patent is hereby corrected as shown below:

On the title page:

Please change: [30] Foreign Application Priority Data
"May 18, 1993" [JP] Japan.....5-058734

To: --March 18, 1993-- [JP] Japan..... 5-058734

Signed and Sealed this

Eighth Day of December, 1998

Attest:

BRUCE LEHMAN

Attesting Officer

Commissioner of Patents and Trademarks